US012776710B2

(12) United States Patent
Boissiere

(10) Patent No.: US 12,776,710 B2
(45) Date of Patent: Oct. 27, 2026

(54) DIRECT VOLTAGE CONVERTER WITH SYNCHRONIZED DIVIDING MODULES

(71) Applicant: VITESCO TECHNOLOGIES GMBH, Hanover (DE)

(72) Inventor: Philippe Boissiere, Toulouse (FR)

(73) Assignee: VITESCO TECHNOLOGIES GMBH, Hanover (DE)

( * ) Notice: Subject to any disclaimer, the term of this patent is extended or adjusted under 35 U.S.C. 154(b) by 193 days.

(21) Appl. No.: 18/750,850

(22) Filed: Jun. 21, 2024

(65) Prior Publication Data

US 2024/0348167 A1 Oct. 17, 2024

Related U.S. Application Data

(63) Continuation of application No. 17/432,396, filed as application No. PCT/EP2020/057455 on Mar. 18, 2020, now Pat. No. 12,143,018.

(30) Foreign Application Priority Data

Mar. 18, 2019 (FR) ....................................... 1902737

(51) Int. Cl.
*H02M 3/158* (2006.01)
*H02M 1/00* (2007.01)

(52) U.S. Cl.
CPC ....... *H02M 3/1584* (2013.01); *H02M 1/0025* (2021.05); *H02M 3/1586* (2021.05)

(58) Field of Classification Search
CPC . H02M 1/0025; H02M 3/1584; H02M 3/1586
See application file for complete search history.

(56) References Cited

U.S. PATENT DOCUMENTS

| | | | | |
|---|---|---|---|---|
| 7,705,579 | B1 | 4/2010 | Hariman | |
| 9,312,785 | B2 | 4/2016 | Zhang | |
| 9,553,513 | B2 | 1/2017 | Xu | |
| 9,912,240 | B1 | 3/2018 | Nguyen | |
| 11,147,132 | B2 | 10/2021 | Huang et al. | |
| 2004/0120169 | A1 * | 6/2004 | Schrom | H02M 3/1584 363/65 |
| 2005/0083024 | A1 | 4/2005 | Harris | |
| 2005/0212502 | A1 * | 9/2005 | Casey | H02M 3/156 323/284 |
| 2007/0001655 | A1 | 1/2007 | Schiff | |
| 2014/0334205 | A1 | 11/2014 | Zhang | |

(Continued)

FOREIGN PATENT DOCUMENTS

| | | | |
|---|---|---|---|
| CN | 103219901 | A | 7/2013 |
| CN | 104065266 | A | 9/2014 |
| CN | 109067179 | A | 12/2018 |

OTHER PUBLICATIONS

International Search Report and Written Opinion of the ISA for PCT/EP2020/057455 dated Jun. 4, 2020, 14 pages.

(Continued)

*Primary Examiner* — Gustavo A Rosario-Benitez
(74) *Attorney, Agent, or Firm* — NIXON & VANDERHYE

(57) ABSTRACT

Disclosed is a DC voltage converter, including a plurality of dividing modules positioned in parallel and synchronized in an interleaved manner, all the dividing modules being controlled by one and the same error signal sampled for each dividing period.

6 Claims, 2 Drawing Sheets

(56) References Cited

U.S. PATENT DOCUMENTS

| | | | | |
|---|---|---|---|---|
| 2015/0077083 | A1* | 3/2015 | Chen | H02M 3/156 323/288 |
| 2016/0011613 | A1* | 1/2016 | Xu | H02M 3/156 323/280 |
| 2018/0034450 | A1 | 2/2018 | Zhao | |
| 2018/0351460 | A1 | 12/2018 | Yu | |
| 2020/0100339 | A1 | 3/2020 | Huang et al. | |
| 2021/0410244 | A1 | 12/2021 | Huang et al. | |

OTHER PUBLICATIONS

Office Action issued in Chinese Patent Application No. 202080022295.6 dated Sep. 20, 2023.

* cited by examiner

DIRECT VOLTAGE CONVERTER WITH SYNCHRONIZED DIVIDING MODULES

CROSS REFERENCE TO RELATED APPLICATIONS

This application is a Continuation of application Ser. No. 17/432,396, filed on Aug. 19, 2021, which is the National Phase under 35 U.S.C. § 371 of International Application No. PCT/EP2020/057455, filed on Mar. 18, 2020, which claims the benefit under 35 U.S.C. § 119(a) to Patent Application No. 1902737, filed in France on Mar. 18, 2019, all of which are hereby expressly incorporated by reference into the present application.

BACKGROUND OF THE INVENTION

Field of the Invention

The invention relates to the field of electronics and more particularly to that of DC voltage converters.

Description of the Related Art

It is known practice to use a dividing module to convert a DC voltage. In a known manner, such a dividing module is able to increase or to reduce the output voltage. The increase or reduction, respectively, is determined by an error signal indicating whether the output voltage is less or greater, respectively, than a desired setpoint or reference voltage. The error signal is sampled at a high frequency/very low period, referred to as the dividing frequency/period. A dividing frequency is typically between 10 and 1000 kHz, for example 400 kHz.

It is also known practice, for significant intensities and/or powers, in order to optimize heat dissipation, to use a plurality of such dividing modules and to position them in parallel.

The problem is that each dividing module operates independently of the others. This leads to potentially harmful oscillations of the output voltage.

It is also known practice to interleave the operation times of the dividing modules, but this is not sufficient to reduce the oscillations of the output voltage sufficiently.

SUMMARY OF THE INVENTION

The synchronization of the various dividing modules should be improved, in order for them to operate in unison and for their efforts to be balanced, so as to produce as stable an output voltage as possible.

The principle of the invention consists in controlling, over each dividing period, the various dividing modules by means of one and the same error signal, storing said error signal over the dividing period, and in synchronizing them, preferably in an interleaved manner.

For this purpose the subject of the invention is a DC voltage converter, comprising at least two dividing modules positioned in parallel and an error module, each dividing module being driven by an error signal determined by the error module and indicative of an error between an output voltage, common to all the dividing modules, and a reference voltage, wherein the converter also comprises a storage module able, for each dividing period, to store the error signal and to transmit an identical stored error signal to all the dividing modules instead of the error signal and a synchronization module able to produce, for each dividing period, one synchronization signal per dividing module, allowing the respective driving of a dividing module in an interleaved manner.

Particular embodiments or features, usable alone or in combination, are:

- the synchronization module is also able to produce, in each dividing period, a storage signal ordering the storage of the storage module,
- each dividing module comprises a transistor half-bridge associated with an inductor, able to divide an input voltage so as to produce a current in said inductor, a comparator module comparing an image of the current with the stored error signal, in order to produce a comparison signal, and a control means producing a control signal for controlling the half-bridge depending on the comparison signal and on a synchronization signal originating from the synchronization module,
- a control means comprises, for producing the control signal, a logical AND function between the synchronization signal and the comparison signal and an RS flip-flop function activated by the output of the logical AND function and deactivated by the inverted comparison signal,
- a synchronization signal is substantially permanently in the high state and exhibits a pulse in the low state once per dividing period, the pulses of the various synchronization signals being interleaved, preferably in a regular manner,
- the storage signal comprises one pulse per dividing period,
- the converter also comprises a drive module for driving the half-bridge able to control one of the transistors of the half-bridge in an exclusive manner when the control signal is in one state and to control the other of the transistors of the half-bridge in an exclusive manner when the control signal is in the other state.

BRIEF DESCRIPTION OF THE DRAWINGS

Other features, advantages and details of the invention will be better understood upon reading the remainder of the description, which will follow, of embodiments given by way of non-limiting examples in connection with drawings in which.

DETAILED DESCRIPTION OF EMBODIMENTS OF THE INVENTION

Figure 1:
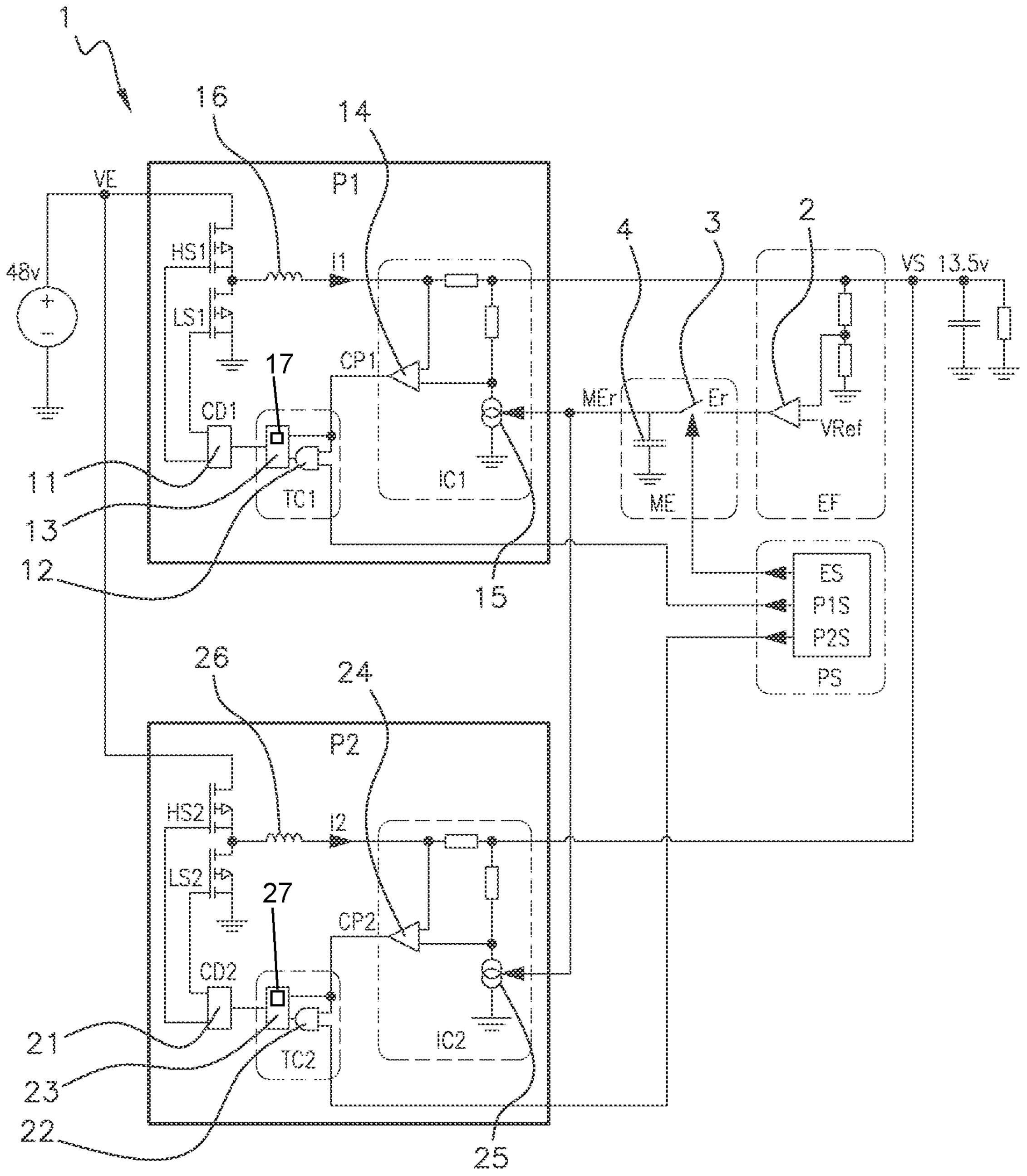
FIG. 1 shows a schematic diagram of a converter according to the invention.

With reference to FIG. 1, the DC voltage converter 1 according to the invention receives an input voltage VE, here for example 48 V, and delivers an output voltage VS, which must remain substantially equal to a setpoint or reference voltage VRef, here for example 13.6 V, and this despite variations in the demand for current.

For this purpose, in a known manner, the converter 1 comprises a dividing module P1. In a known manner such a dividing module P1 comprises a half-bridge comprising two switching means HS1, LS1, such as transistors, connected in series between the input voltage VE and ground. The output voltage VS is sandwiched between the two transistors HS1, LS1. One, "high-side" transistor HS1 positioned between the input voltage VE and the output voltage VS is driven when the current I1 in the dividing module P1 must be increased. The other, "low-side" transistor LS1 positioned between the output voltage VS and ground is driven when the current I1 in the dividing module P1 must be reduced. In a known manner, a drive module 11 drives the two transistors HS1, LS1 in an exclusive manner. This drive module 11 is controlled by a control signal CD1.

In a known manner, an error module EF compares, by means of a comparator 2, the output voltage VS with a setpoint voltage VRef and produces an error signal Er indicative of the difference between the output voltage VS and the desired reference voltage VRef.

In a known manner, a comparator module IC1 compares, by means of a comparator 14, a setpoint current produced by a current generator 15 driven by an error signal MEr originating from the error module EF with the current I1 flowing in the dividing module P1. This comparison produces a comparison signal CP1.

Incidentally, a dividing module according to the prior art thus operates in an autonomous and controlled manner. The control module TC1 and the storage module ME, added by the invention, are absent. The signal MEr is equal to the error signal Er and drives the comparator module IC1. The control signal CD1 is equal to the comparison signal CP1: the drive module 11 drives the transistor HS1 so as to increase the current I1 when CP1 is in the high state, indicative of a current I1 less than the setpoint, and by contrast the drive module 11 drives the transistor LS1 so as to reduce the current I1 when CP1 is in the low state, indicative of a current I1 greater than the setpoint.

In addition to the dividing module P1, the converter 1 according to the invention also comprises at least a second dividing module P2. There may be any number of dividing modules. The dividing modules are positioned in parallel: they receive the same input voltage VE and all contribute to the output voltage VS. All the dividing modules are identical in all respects.

FIG. 1 illustrates a converter 1 with two such dividing modules P1, P2. For the alphabetical reference signs, the index 1 relates to the first dividing module P1 and the index 2 relates to the second dividing module P2. For the numerical reference signs, a sign 1*x* denotes, in the first dividing module P1, the same component 2*x* in the second dividing module P2.

The converter 1 according to the invention also comprises, in a characteristic manner, a storage module ME. This storage module ME is common to all the dividing modules. It is able, for each dividing period T, to store the error signal Er. This is depicted by a sampler 3, controlled by a signal ES, and a holder/storage means 4 which stores the value of the error signal Er on command of the sampler 3. The stored signal is referred to as MEr. It is thus identical to the error signal Er at the moment of storage and remains substantially equal to this value during a dividing period T. This stored signal MEr is transmitted to all the dividing modules P1, P2, and replaces, relative to the prior art, the error signal Er.

An important feature of the invention should be noted: over a dividing period T, all the dividing modules P1, P2 are controlled by an identical stored value MEr of the error signal Er. This contributes to a great stability of the output voltage VS being obtained, in that all the dividing modules are controlled by one and the same setpoint.

Because of the presence of a plurality of dividing modules P1, P2, the converter 1 according to the invention also comprises a synchronization module PS. This synchronization module PS is able to produce, for each dividing period T, one respective synchronization signal P1S, P2S per dividing module P1, P2. Each such synchronization signal P1S, P2S selectively allows the associated dividing module P1, P2 to perform the driving in order to correct the corresponding current I1, I2. Advantageously, the synchronization signals P1S, P2S are interleaved.

The storage performed by the storage module ME is driven by a storage signal ES. This storage signal ES is a clock with a period equal to the dividing period T. It is produced by a module, for example the synchronization module PS.

In order to be sure that the stored error signal MEr is established during its use for the control of one of the dividing modules P1, P2, the storage pulse of the storage signal ES is advantageously offset in order not to coincide with any one pulse of one of the synchronization signals P1S, P2S.

As previously described, each dividing module P1, P2 comprises a transistor half-bridge, each comprising a "high-side" transistor HS1, HS2, a "low-side" transistor LS1, LS2 and a drive module 11, 21 associated with an inductor 16, 26, able to divide the input voltage VE so as to produce a current I1, 12 in said inductor 16, 26, and a comparator module IC1, IC2 which compares an image of the current I1, 12 with the stored error signal MEr in order to produce a comparison signal CP1, CP2.

The converter 1 according to the invention also comprises, in a characteristic manner, a control module TC1, TC2 which produces a control signal CD1, CD2 for controlling the half-bridge HS1, LS1, 11, HS2, LS2, 21 depending on the comparison signal CP1, CP2 and on a synchronization signal P1S, P2S originating from the synchronization module PS. Such a control module TC1, TC2 is added by the invention into each of the dividing modules P1, P2 respectively.

The function of a control module TC1, TC2 is to modify the comparison signal CP1, CP2 by interrupting it depending on the synchronization signal P1S, P2S in order to produce the control signal CD1, CD2, which effectively drives the transistor half-bridge.

The principle of a control module TC1, TC2 is to produce a control signal CD1, CD2 which reproduces the comparison signal CP1, CP2 following an indication from the synchronization signal P1S, P2S, but returns to the low state when the comparison signal indicates that the current I1, 12 has reached its setpoint value MEr. It follows that a dividing module P1, P2 is driven as if it were alone, depending on the comparison of the current I1, 12 with the setpoint MEr, but only between the reception of the synchronization signal P1S, P2S and a moment when the current I1, 12 reaches and/or exceeds said setpoint MEr. The control is then stopped until the next indication from the synchronization signal P1S, P2S. The interleaving thus allows the other dividing modules to be involved in a temporally offset manner and to contribute to the production of the output voltage VS.

For this purpose, according to one possible embodiment, a control module TC1, TC2 comprises, for producing the control signal CD1, CD2, a logical AND function 12, 22 and an RS flip-flop function 13, 23. The logical AND function 12, 22 is positioned between the synchronization signal P1S, P2S and the comparison signal CP1, CP2.

An RS flip-flop, in a known manner, performs a temporal storage function. It exhibits an activation input SET and a reinitialization/deactivation input RESET. It provides, at the output, a signal maintained in the high state if the last signal in the high state was seen at the input SET and a signal maintained in the low state if the last signal in the high state was seen at the input RESET, including if the signal which produced a change of state has since returned to the low state.

The output of the logical AND function 12, 22 is connected to the activation input SET of said RS flip-flop function 13, 23 including an inverter 17, 27 at which the comparison signal CP1, CP2 is inverted. The inverted comparison signal CP1, CP2 is connected to the deactivation input RESET. The input SET is only sensitive to a rising edge.

Thus, a rising edge of the synchronization signal P1S, P2S combined by the logical "AND" function with a high state of the comparison signal CP1, CP2 activates the RS flip-flop and puts the control signal CD1, CD2 in the high state. By contrast, a low state, because of the presence of an inverter, of the comparison signal CP1, CP2 deactivates the RS flip-flop and puts the control signal CD1, CD2 in the low state. Because of the memory effect ensured by the "RS" flip-flop, said low state of the control signal CD1, CD2 is thus obligatorily maintained until the next rising edge of the synchronization signal P1S, P2S.

In a synchronization signal P1S, P2S, the rising edge is the important phenomenon, because of the exclusive sensitivity of the RS flip-flop to a rising edge. Thus, a synchronization signal P1S, P2S is advantageously substantially permanently in the high state and exhibits a pulse in the low state once per dividing period T, in order to be able to exhibit a rising edge.

The pulses of the various synchronization signals P1S, P2S are interleaved. This interleaving is preferably regular: the dividing period T is divided regularly by said pulses into as many equal parts as there are dividing modules P1, P2.

In order for all the dividing modules P1, P2 to be, for each dividing period T, controlled by one and the same stored error signal MEr, the storage is performed periodically according to a period equal to the dividing period T. Thus the storage signal ES comprises one pulse per dividing period T.

The drive module 11, 21 for driving a half-bridge is able to control one of the transistors HS1, HS2 of the half-bridge in an exclusive manner when the control signal CD1, CD2 is in one state and to control the other of the transistors LS1, LS2 of the half-bridge in an exclusive manner when the control signal CD1, CD2 is in the other state.

Figure 2:
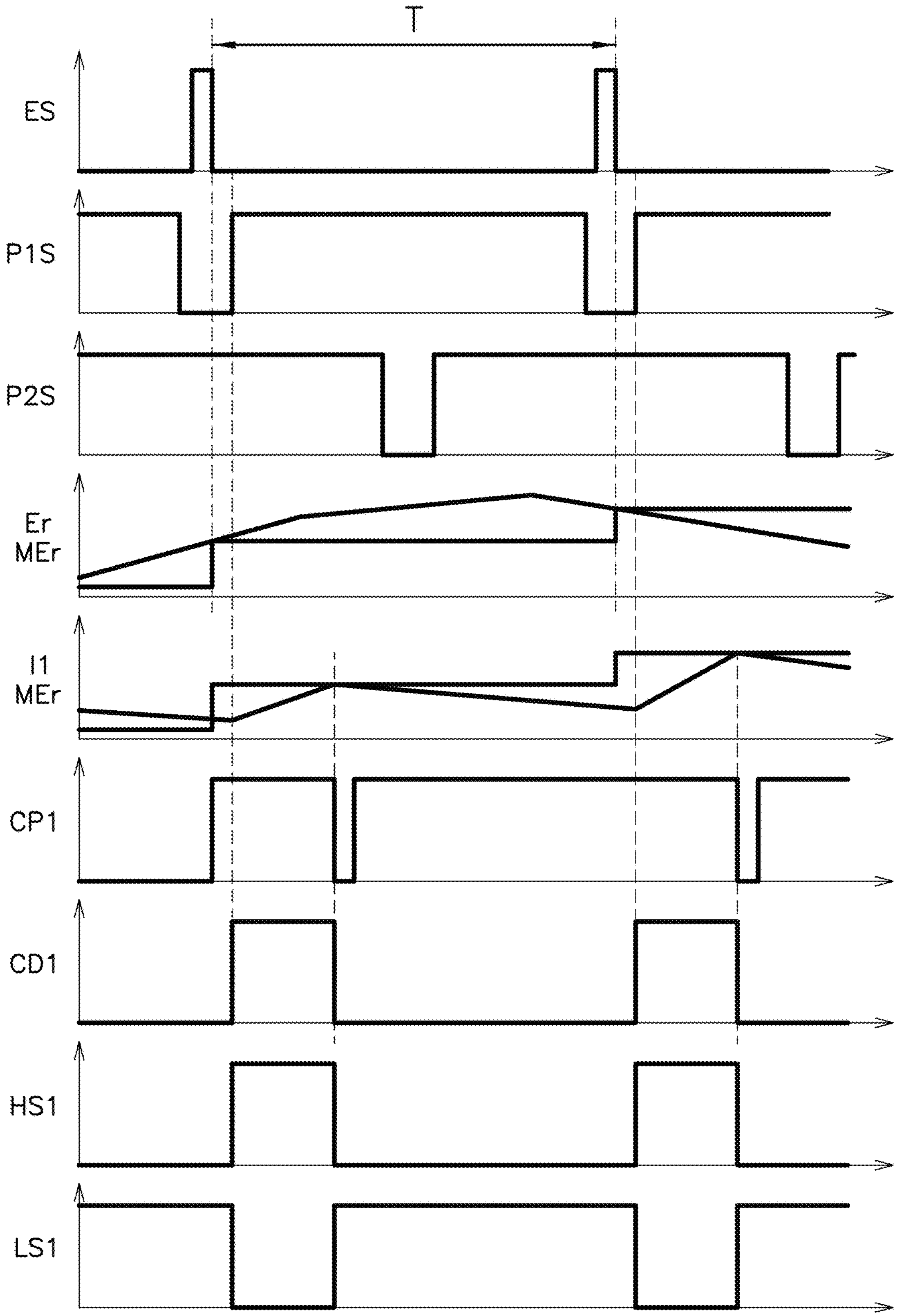
FIG. 2 shows, on a comparative timing diagram, various signals indicative of the operation of the converter.

With reference to FIG. 2, in order to complete the description, the temporal operation of the converter 1 according to the invention will now be described. FIG. 2 shows curves depicted on diagrams all sharing, for the purpose of comparison, the same time scale on the horizontal axis.

From top to bottom, the first curve represents the synchronization signal ES which allows the storage MEr of the error signal Er by the storage module ME to be synchronized. The storage signal ES is predominantly in the low state, it rises for a brief moment to the high state so as to close the sampler 3 and falls back to the low state according to a periodic pulse with a period equal to the dividing period T. The new value of the stored error signal MEr is available from this falling edge.

The second and third curves depict the respective synchronization signals P1S, P2S of the dividing modules P1, P2. There should be as many synchronization signals as dividing modules, here for example 2. A synchronization signal P1S, P2S is predominantly in the high state, it falls for a brief moment to the low state so as to be able to rise back to the high state according to a periodic pulse with a period equal to the dividing period T. The respective pulses of the various synchronization signals are interleaved, advantageously regularly. The rising edge is the useful event in that it drives the control module TC1, TC2 and allows the control.

The fourth and fifth curves, shown on the same diagram, show the error signal Er and the stored error signal MEr, respectively, the latter being tier-wise constant. The error signal Er changes. The stored error signal MEr fixes its value, as emphasized by the dotted lines, during a falling edge of the storage signal ES. This value is substantially maintained, for a period T, until the next storage.

The sixth and seventh curves, shown on one and the same diagram, depict the stored error signal MEr again and the current I1 in the first dividing module P1, respectively, for the purpose of comparison, such as that performed by the comparison module IC1.

The eighth curve depicts the comparison signal CP1 produced by the comparison module TC1. It may be verified that the comparison signal CP1 is in the low state when I1 is greater than the stored error signal MEr and in the high state otherwise. A high state of the comparison signal CP1 indicates that the current I1 is too weak and that the high-side transistor HS1 of the half-bridge should be controlled so as to correct this by increasing the current I1. It may be noted that controlling the low-side transistor LS1 or, in equivalent fashion, not controlling the high-side transistor HS1, entails a drop in the current I1.

The ninth curve depicts the control signal CD1, originating from the transformation of the comparison signal CP1 by the control module TC1. The control signal CD1 is initially in the low state. It moves to the high state, as emphasized by a dotted line, on a rising edge of the synchronization signal P1S, while the comparison signal CP1 is simultaneously in the high state, this combination of signals P1S AND CP1 being at the activation input SET of the flip-flop 13. Because of the storage performed by the flip-flop 13, this high state is maintained independently of the state of the signals (CP1, P1S) present at said activation input SET.

Thus, the high-side transistor HS1 of the half-bridge is controlled from the moment when the pulse of the synchronization signal P1S (rising edge) is received, if and only if the current I1 is less than the stored error signal MEr, which is depicted by CP1 in the high state. Thus the dividing module P1 is only allowed to be driven following reception of the pulse of the synchronization signal P1S, if such driving is necessary: the current I1 is less than the stored error signal MEr, and only as long as this driving is necessary: as soon as the current I1 catches up with the stored error signal MEr, the driving is stopped and is prohibited for the rest of the dividing period T of the synchronization signal in progress.

The control signal CD1 returns to the low state, as emphasized by a dotted line, when the comparison signal CP1 returns to the low state, since inverted CP1 is connected to the deactivation input RESET of the flip-flop 13. Because of the storage performed by the flip-flop 13, this low state is maintained independently of the state of the signal (NOT (CP1)) present at said deactivation input RESET. This is maintained until the next pulse of the synchronization signal Pls.

Thus, the high-side transistor HS1 of the half-bridge is no longer controlled from the moment when the comparison signal CP1 becomes zero, indicative of the fact that the current I1 has equalled or exceeded the stored error signal MEr.

The tenth and eleventh curves depict the drive signals HS1 and LS1, respectively, for driving the transistors HS1, LS1 and produced by the drive module 11 from the control signal CD1. The function here is simple: the signal HS1 reproduces the control signal CD1, HS1=CD1 and the signal LS1 inverts the control signal LS1=NOT(CD1). It may be verified that the two transistors HS1, LS1 are driven disjointly.

The curves 12, CP2, CD2, HS2, LS2, which are not shown, exhibit similar profiles, while however being synchronized with the synchronization signal P2S, or here offset by half a dividing period T/2.

The invention claimed is:

1. A DC voltage converter system comprising:

at least two dividing modules positioned in parallel;

an error module configured to generate an error signal indicative of an error between an output voltage and a reference voltage;

a storage module configured, for each dividing period, to store the error signal and to transmit the identical stored error signal to all the dividing modules instead of the error signal; and a synchronization module configured to produce, for each dividing period, one synchronization signal for each respective one of the dividing modules allowing the respective driving of the respective dividing modules in an interleaved manner, the synchronization module being configured to produce a storage signal transmitted to and received by the storage module, the storage signal comprising one pulse per dividing periods, wherein the storage module is controlled by the storage signal to store the error signal, for each dividing period.

2. The converter as claimed in claim 1, further comprising a control module configured to produce a control signal, the control module comprising a logical AND function between the synchronization signal and a comparison signal, and an RS flip-flop function activated by the output of the logical AND function and deactivated by the comparison signal that is inverted.

3. The converter as claimed in claim 2, wherein the synchronization signal is substantially permanently in the high state and exhibits a pulse in the low state once per dividing period, the pulses of the various synchronization signals being interleaved.

4. The converter as claimed in claim 2, further comprising a drive module configured to control a first transistor of a half-bridge in an exclusive manner when the control signal is in one state and to control a second transistor of the half-bridge in an exclusive manner when the control signal is in the other state.

5. The converter as claimed in claim 1, wherein the synchronization signal is substantially permanently in the high state and exhibits a pulse in the low state once per dividing period, the pulses of the various synchronization signals being interleaved.

6. The converter as claimed in claim 1, wherein the storage module is common to all the dividing modules.

* * * * *